US010645186B2

(12) United States Patent
Jensen et al.

(10) Patent No.: US 10,645,186 B2
(45) Date of Patent: May 5, 2020

(54) SPECULATIVE CACHING IN A CONTENT DELIVERY NETWORK

(71) Applicant: Level 3 Communications, LLC, Broomfield, CO (US)

(72) Inventors: Daniel Lee Jensen, Lake Balboa, CA (US); William Crowder, Camarillo, CA (US); Christopher Newton, Westlake Village, CA (US); William R. Power, Boulder, CO (US)

(73) Assignee: Level 3 Communications, LLC, Broomfield, CO (US)

(*) Notice: Subject to any disclaimer, the term of this patent is extended or adjusted under 35 U.S.C. 154(b) by 179 days.

(21) Appl. No.: 15/960,393

(22) Filed: Apr. 23, 2018

(65) Prior Publication Data

US 2019/0327326 A1 Oct. 24, 2019

(51) Int. Cl.
*H04L 29/08* (2006.01)
*H04L 29/06* (2006.01)

(52) U.S. Cl.
CPC .......... *H04L 67/2842* (2013.01); *H04L 67/42* (2013.01)

(58) Field of Classification Search
CPC .................................................. H04L 67/2842
See application file for complete search history.

(56) References Cited

U.S. PATENT DOCUMENTS

| 2012/0159558 A1* | 6/2012 | Whyte .............. H04N 7/17336 725/95 |
| 2017/0085669 A1* | 3/2017 | Khakpour ........... H04L 67/2842 |
| 2018/0091619 A1 | 3/2018 | Power et al. |

OTHER PUBLICATIONS

International Search Report and Written Opinion of the International Searching Authority, dated Dec. 17, 2018, Int'l Appl. No. PCT/US18/039022, Int'l Filing Date Jun. 22, 2018; 15 pgs.

* cited by examiner

*Primary Examiner* — Andrew C Georgandellis

(57) ABSTRACT

A server in a content delivery (CD) network that distributes content on behalf of one or more subscribers. Responsive to a request from a client for a particular resource, if the particular resource is already in a cache on the server, serving the particular to the client from the cache; otherwise if the particular resource is not already cached on the server, when a count value exceeds a first threshold value, obtaining, caching, and serving the particular resource. When the count value is less than a second threshold value, obtaining and serving the particular resource. When the count value is: (i) not less than the second threshold value, and (ii) not greater than the first threshold value, then obtaining the particular resource and selectively caching the particular resource; and serving the particular resource to the client.

11 Claims, 5 Drawing Sheets

| RESOURCE | COUNT |
|---|---|
| R1 | COUNT(R1) |
| R2 | COUNT(R2) |
| | |
| RP | COUNT(RP) |

302

SPECULATIVE CACHING IN A CONTENT DELIVERY NETWORK

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

SOURCE CODE

This application includes a source code appendix, which is considered part of the application for all purposes.

FIELD OF THE INVENTION

This invention relates to caching in content delivery and content delivery networks. More specifically, to speculative caching in content delivery networks and systems, frameworks, devices and methods supporting caching in content delivery and content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

GLOSSARY

As used herein, unless used otherwise, the following terms or abbreviations have the following meanings:

CD means content delivery;
CDN means content delivery network;
DNS means domain name system; and
URL means Uniform Resource Locator.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

DESCRIPTION

A content delivery network (CDN or CD network) distributes content (e.g., resources) efficiently to clients on behalf of one or more content providers (or subscribers), preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

Figure 1:
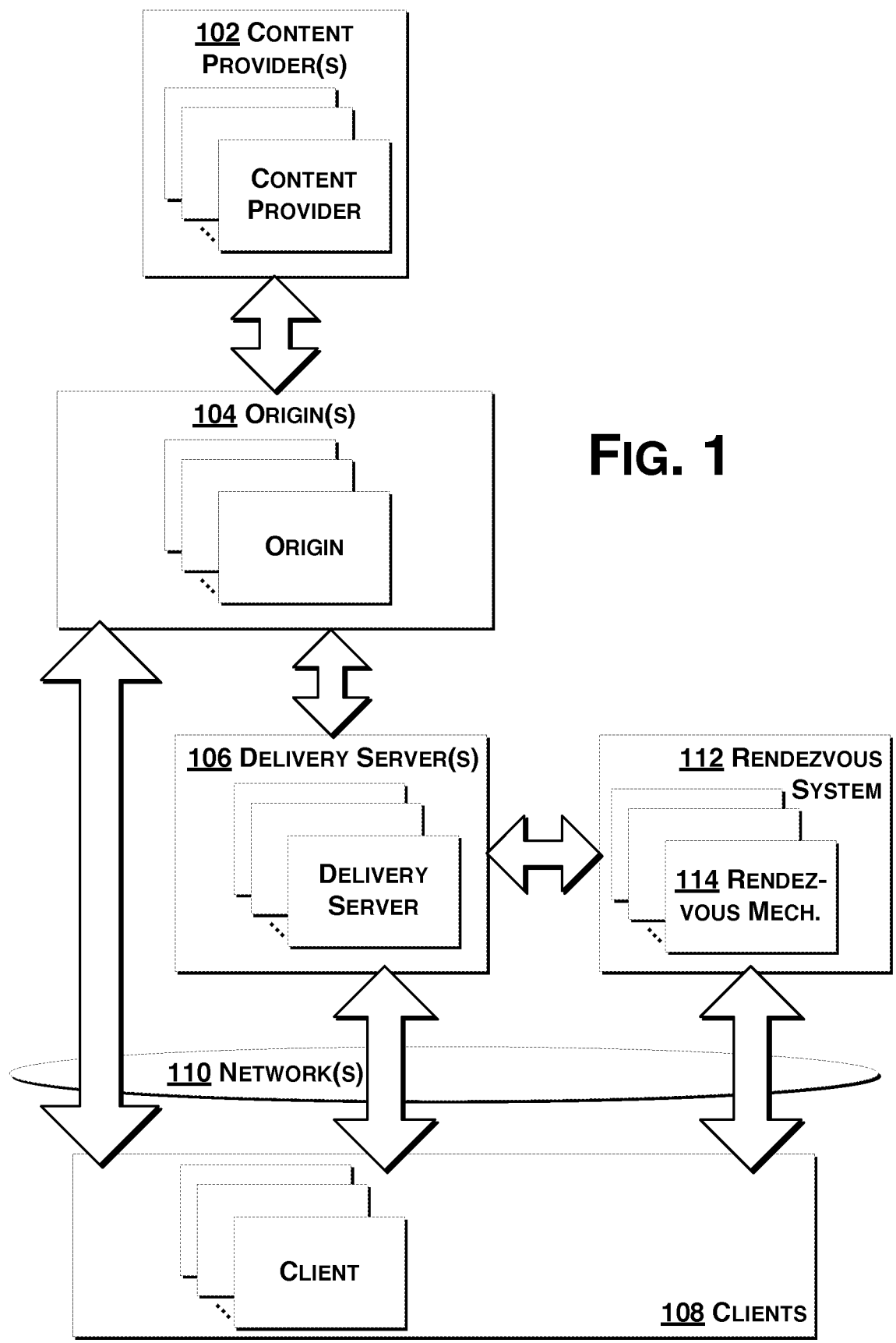
FIG. 1 depicts aspects of a content delivery network (CDN) according to exemplary embodiments hereof.

FIG. 1 shows aspects of an exemplary CDN in which one or more content providers (or subscribers) 102 provide content via one or more origin sources 104 and delivery services (servers) 106 to clients 108 via one or more networks 110. The delivery services (servers) 106 may form a delivery network from which clients 108 may obtain content. The delivery services 106 may be logically and/or physically organized hierarchically and may include edge caches. The delivery services 106 may be logically and/or physically organized into clusters.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Client requests (e.g., for content) may be associated with delivery server(s) 106 by a rendezvous system 112 comprising rendezvous mechanism(s) 114, possibly in the form of one or more rendezvous networks. The rendezvous mechanism(s) 114 may be implemented, at least in part, using or as part of a DNS system, and the association of a particular client request (e.g., for content) with one or more delivery servers may be done as part of DNS processing associated with that particular client request (e.g., of a domain name associated with the particular client request).

Typically, multiple delivery servers 106 in the CDN can process or handle any particular client request for content (e.g., for one or more resources). Preferably the rendezvous system 112 associates a particular client request with one or more "best" or "optimal" (or "least worst") delivery servers 106 to deal with that particular request. The "best" or "optimal" delivery server(s) 106 may be one(s) that is (are) close to the client (by some measure of network cost) and that is (are) not overloaded. Preferably the chosen delivery server(s) 106 (i.e., the delivery server(s) chosen by the rendezvous system 112 for a client request) can deliver the requested content to the client or can direct the client, somehow and in some manner, to somewhere where the client can try to obtain the requested content. A chosen delivery server 106 need not have the requested content at the time the request is made, even if that chosen delivery server 106 eventually serves the requested content to the requesting client.

When a client 108 makes a request for content, the client may be referred to as the requesting client, and the delivery server 106 that the rendezvous system 112 associates with that client request (and that the client first contacts to make the request) may be referred to as the "contact" server or just the contact.

Exemplary CDNs are described in U.S. Pat. Nos. 8,060,613 and 8,925,930.

Figure 2A:
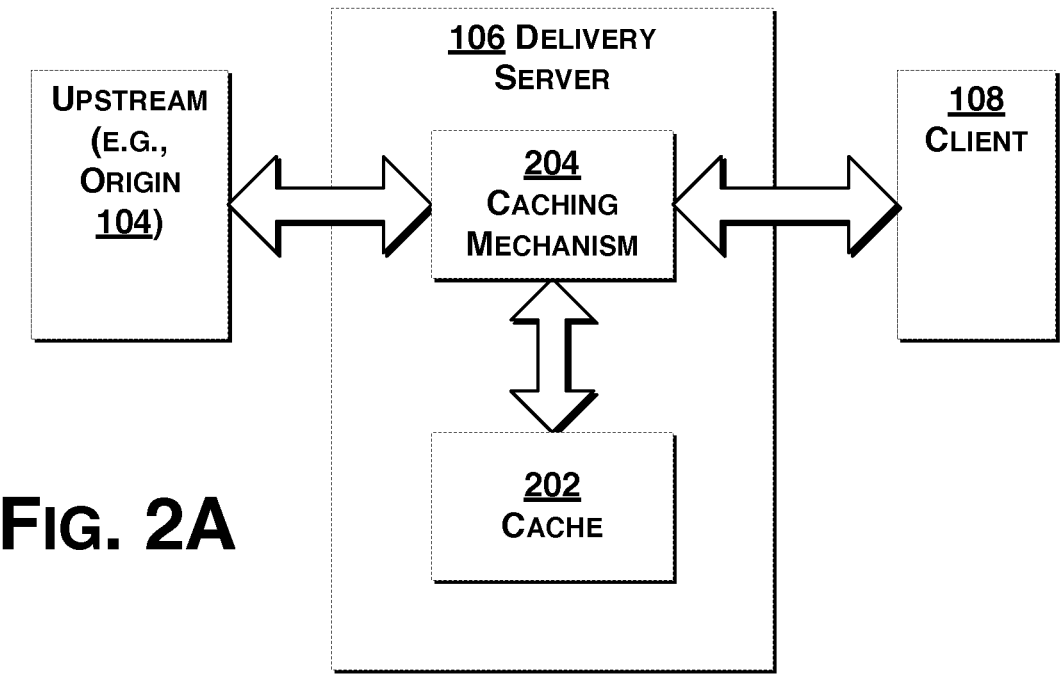
FIGS. 2A-2B and 3A-3B depict aspects of exemplary embodiments of speculative caching according to exemplary embodiments hereof.
Figure 2B:
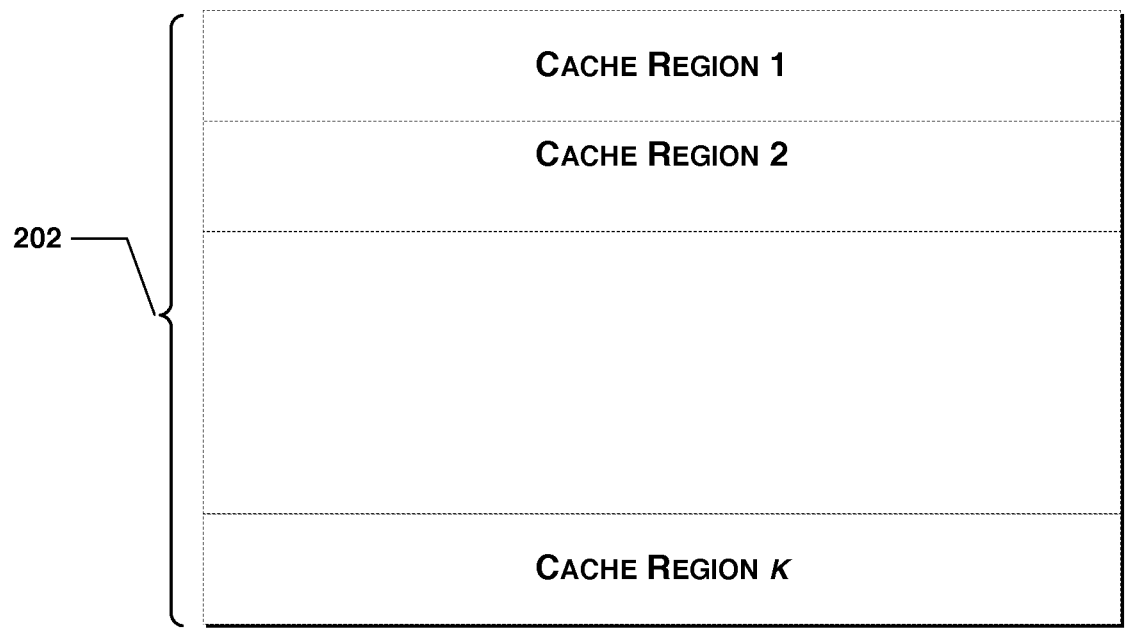

FIGS. 2A-2B and 3 depict aspects of exemplary embodiments of speculative caching according to exemplary embodiments hereof.

With reference to FIG. 2A, when a client requests a particular resource (R), the client is directed, as described above, to a particular delivery server (or server cluster) 106 from which to request the resource (R). If the delivery server 106 has a valid version of the resource (R) in its cache 202, then the resource (R) is served to the client 108 from the cache. On the other hand, if the delivery server 106 does not have a cached valid version of the resource (R), then the delivery server 106 may try to obtain the resource (R) from another location (e.g., an upstream location such as an origin server 104 or a peer delivery server). Having obtained the resource (R) from elsewhere, the delivery server 106 then serves the resource to the client.

A caching mechanism 204 on the delivery server 106 may decide whether or not to cache the requested resource (R) in the server's cache 202.

The cache 202 on delivery server 106 may be logically (and/or physically) organized into multiple distinct regions. For example, as shown in FIG. 2B, the cache 202 is organized into k distinct regions, k≥1. These regions may, e.g., correspond to different regions on one or more disks, or they may each correspond to a different storage device. If a resource (R) is to be cached on/by a delivery server, a function (e.g., a hash function) may be applied to the resource (and/or its URL) to determine which region to use for caching that resource. For example, a particular function C(Resource) may return a value in the range 1 to k, and so that function C applied to the requested resource (R) may determine which cache region (region #1 . . . region #k) is to be used to cache the particular resource R.

As should be appreciated, there is overhead (e.g., time, space, etc.) associated with caching a resource. In addition, caching a resource may require (force) the removal of an already-cached resource. It is thus generally not desirable to cache resources that are not likely to be requested again (e.g., so-called "long-tail" resources). On the other hand, it is generally desirable to cache popular resources. In this regard, the caching mechanism 204 on each delivery server 106 may make a local decision about local popularity of each requested resource. It should be noted that a caching mechanism 204 may also use external information about resource popularity, e.g., as provided by other delivery servers in the CDN.

Figures 3A, 3B:
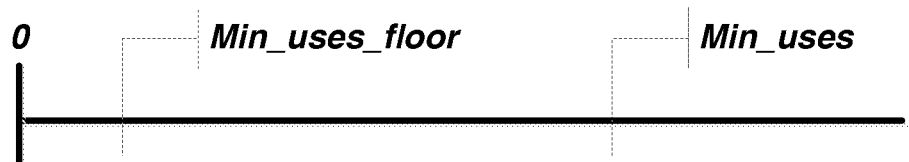

The caching mechanism 204 preferably maintains (e.g., stores) two threshold values, namely (i) a min_uses value, and (ii) a min_uses_floor value, where 0≤min_uses_floor ≤min_uses (see, e.g., FIG. 3A).

For a requested resource (R), the caching mechanism 204 also maintains a count of requests for that resource (R), denoted Count(R). Preferably the caching mechanism 204 maintains the count for recent requests for resource R, where, as used here, the term "recent" may refer to requests occurring in the past period of time (e.g., 1 minute, 5 minutes, 10 minutes, 1 hour, 10 hours, etc.). For example, the caching mechanism 204 may maintain a table 302 or the like to map resources to their corresponding count (or recent count) values. The "resource" column of the table 302 may use some or all of the URL or of information in the URL (e.g., the "path" portion of the URL) used to refer to resource R. While a table is shown in the example in FIG. 3B, those of ordinary skill in the art will appreciate and understand, upon reading this description, that any structure that maps resources to their corresponding count values may be used.

Using the mapping 302, the recent count value for a resource R (Count(R)) may be determined.

As should be appreciated, Count(R) provides a local measure of popularity of the resource R at the delivery server 106.

If the value Count(R) is greater than min_uses, then the resource R is to be cached. As described above, R will be cached in the storage region determined by the mapping function (e.g., function C(Resource) described above). If the storage region does not have enough space for R, some or all of another resource may be removed from that storage region. In some implementations, the least recently used (LRU) resources are removed until enough space is available for R.

If the value Count(R) is less than min_uses_floor, then the resource R will not be cached.

If the value Count(R) is greater than min_uses_floor and less than min_uses, then the resource R may be speculatively cached in the storage region determined by the mapping function (e.g., function C(Resource) described above), depending on the amount of space in the storage region. For example, if min_uses_floor<Count(R)<min_uses, then resource R may be cached, depending on how much storage space is currently available for the resource R in the storage region to which resource R is allocated. As should be appreciated, it is expected that caching the resource R will not result in ejecting other resources to make room, but in implementations where the size of the resource R is not known before the decision to cache is made, that guarantee cannot be made.

The caching mechanism 204 may make its caching determination about a particular resource R before obtaining the resource. The caching mechanism 204 may modify information associated with the request sent to the upstream server, e.g., by modifying the request header sent to the upstream server (e.g., by removing the Range header item), if needed, to obtain a cachable version of the requested resource. This is particularly the case where the original request was for less than all of the resource (e.g., for a range). In such cases, the caching mechanism 204 may request the full resource (e.g., with the range limits removed). The client 108 receives what they requested, and the full resource is cached.

As should be appreciated, caching a resource R when min_uses_floor<Count(R)<min_uses, is speculative, as the value of Count(R) may not exceed the threshold value of min_uses.

Figure 4:
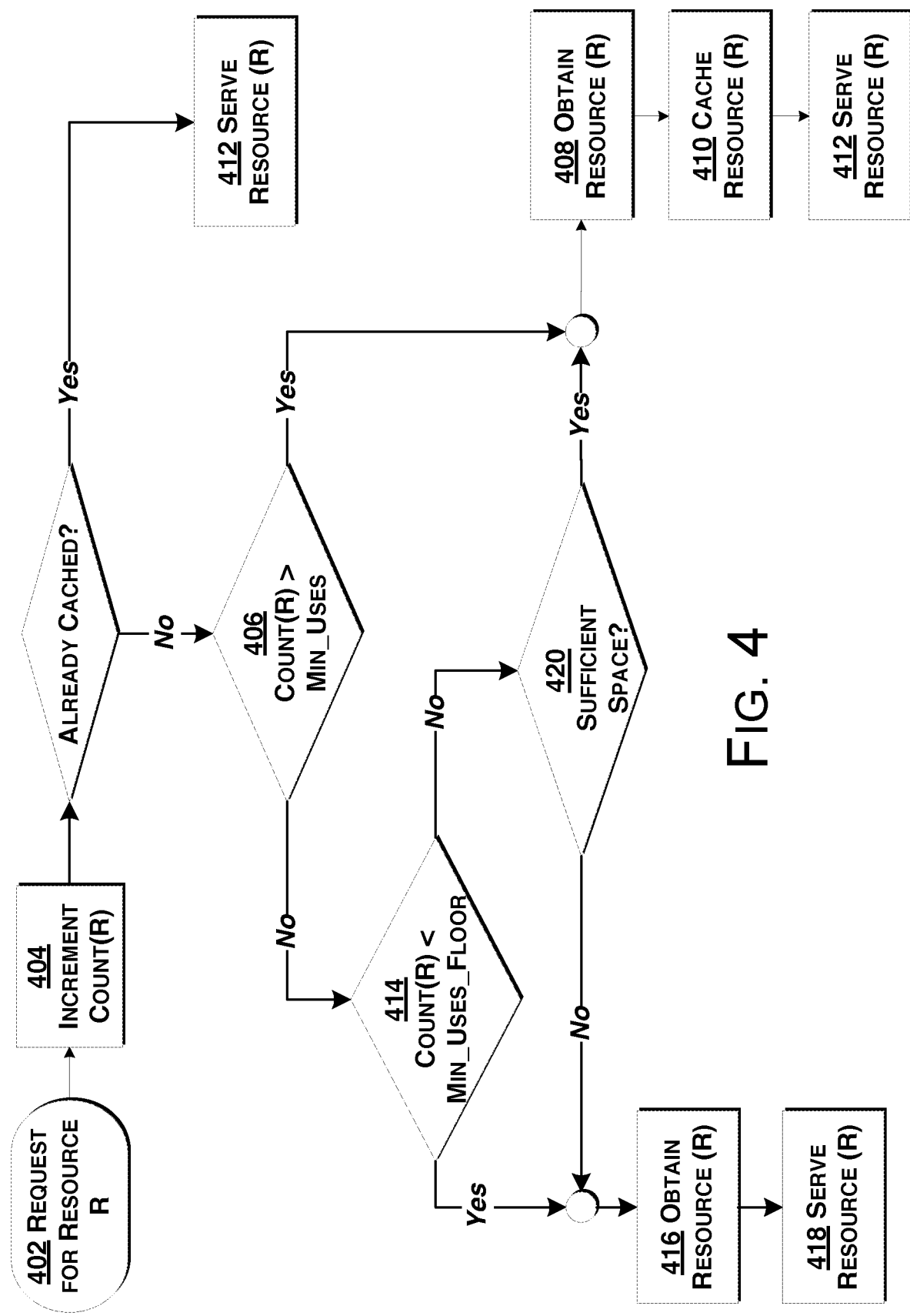
FIG. 4 is a flowchart depicting aspects of caching according to exemplary embodiments hereof.

FIG. 4 is a flowchart showing exemplary operation of the caching mechanism 204.

The delivery server 106 receives (at 402) a request from a client 108 for a particular resource R. The caching mechanism 204 in the delivery server 106 increments the value of Count(R) by one (at 404) and determines (at 406) if the value of Count(R) is greater than the threshold value min_uses. This determination may use the value of Count(R) in the mapping 302.

If it is determined (at 406) that Count(R)≥min_uses, then the requested resource is to be cached. The server 106 obtains the resource (e.g., from an origin server or a peer) (at 408), caches the resource (at 410), and serves the resource R to the client 108 (at 412).

If it is determined (at 406) that Count(R) is not greater than or equal to min_uses, then the caching mechanism 204 determines (at 414), whether the value of Count(R) is less than the value of min_uses_floor. If the value of Count(R) is less than the value of min_uses_floor, then the resource is not to be cached, and the delivery server 106 obtains the resource (R) (at 416) and serves that resource to the client 108 (at 418).

If it is determined (at 414), that the value of Count(R) is not less than the value of min_uses_floor, then the requested resource is to be cached if there is sufficient space (as determined at 420), in which case processing may continue with the obtaining (at 408), caching (at 410), and serving (at 412). On the other hand, if it is determined (at 414), that Count(R)≥min_uses_floor, and there is not sufficient space (as determined at 420), then the resource is not cached.

As used herein, the term "sufficient space," does not require that there be enough space to store the resource R without evicting one or more other resources. Those of ordinary skill in the art will realize and appreciate, upon reading this description, that, in general, the size of a requested resource will not be known until after a request for that resource has been made and response headers have been received. Thus, in presently preferred implementations, the decision at 420 of the flowchart is based only on the two threshold values and the amount of free disk space in the selected cache region, and the size of the requested resource does not factor into it. In some embodiments, the server could consider the size of the requested resource, but this may be at the cost of an extra upstream request to determine the size of the resource prior to requesting the resource itself. If the resource turns out to be very large, the server may need to evict one or more other resources from the cache in order to accommodate it. As should be appreciated, considering the size of the requested resource gives a higher weight to carefully managing the amount of storage available, and a lower weight to serving the resource to the client as quickly as possible.

Since the caching when min_uses_floor≤Count(R)<min_uses is, essentially, speculative, the above approach avoids penalizing already cached resources whose count is greater than min_uses.

While shown in the drawing as sequential acts, those of ordinary skill in the art will appreciate and understand, upon reading this description, that some or all of the obtaining (at 408), caching (at 410), and serving (at 412) may occur, at least in part, in parallel.

As noted above, the caching mechanism 204 may modify the request to ensure that it obtains the full resource (R). Thus, the obtain resource (at 408) may include modifying information associated with the request (e.g., by modifying the request header sent to the upstream server such as, by removing the Range header item), whereas the obtain resources (at 416) need not modify the request. In either case, the client is served with the requested part of resource (R) (e.g., with the requested range).

As can be seen, the decision to speculatively cache a resource is a function of the count for that resource (Count (R)) and the available space allocation for that resource. Accordingly, in some embodiments, the tests or determinations (at 414 and 420) may be ordered differently or combined.

In addition, in some embodiments, the value of the threshold min_uses may be modified or scaled based on how full the cache currently is. Appendix A includes source code for scaling the value of min_uses accordingly.

COMPUTING

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 5:
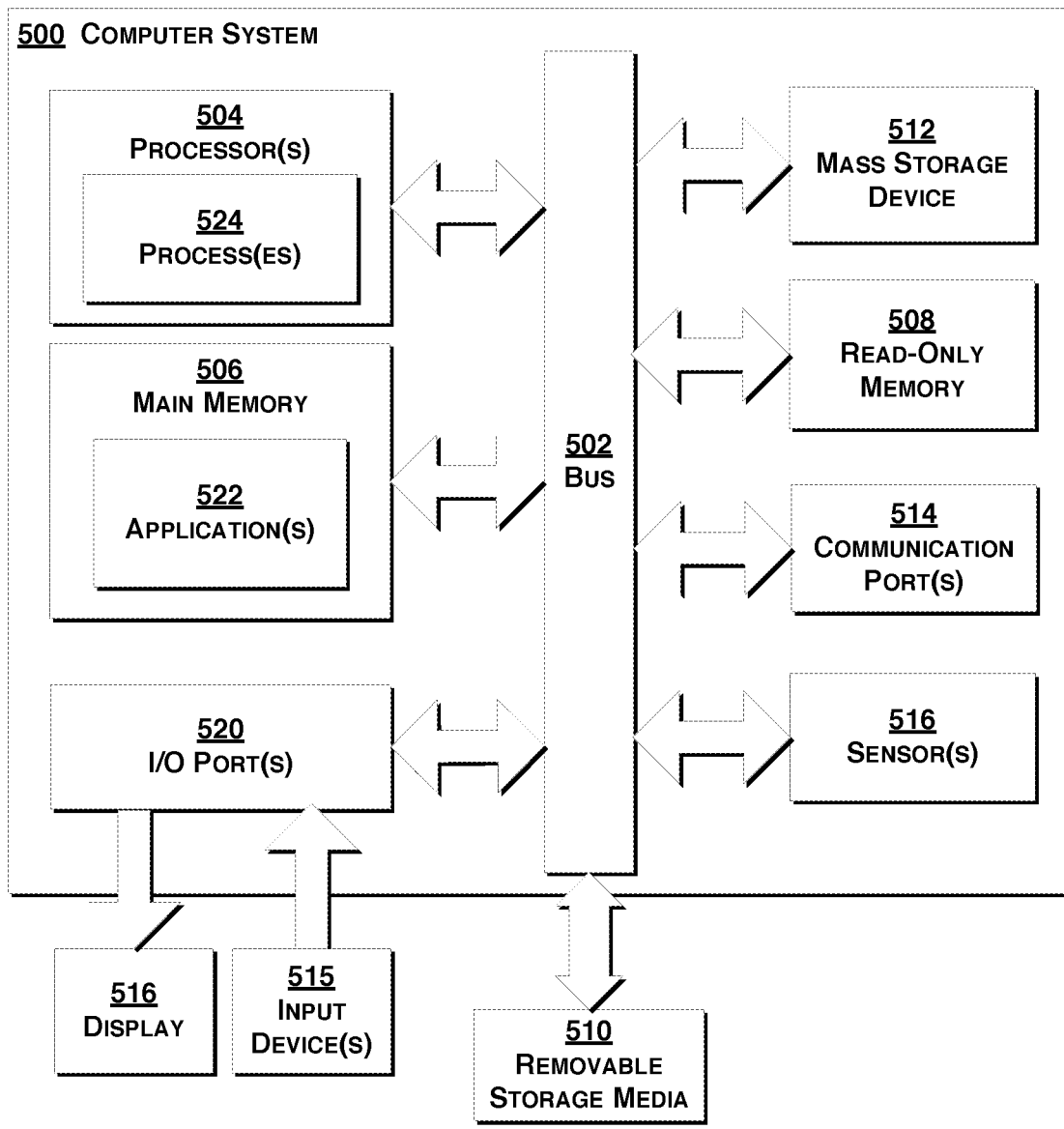
FIG. 5 depicts aspects of computing according to exemplary embodiments hereof.

FIG. 5 is a schematic diagram of a computer system 500 upon which embodiments of the present disclosure may be implemented and carried out.

According to the present example, the computer system 500 may include a bus 502 (i.e., interconnect), one or more processors 504, a main memory 506, read-only memory 508, removable storage media 510, mass storage 512, and one or more communications ports 514. As should be appreciated, components such as removable storage media are optional and are not necessary in all systems. Communication port 514 may be connected to one or more networks by way of which the computer system 500 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be any known processor, such as, but not limited to, an Intel® Itanium® or Itanium 2® processor(s), AMD® Opteron® or Athlon MP® processor(s), or Motorola® lines of processors, and the like. Communications port(s) 514 can be any of an RS-232 port for use with a modem based dial-up connection, a 10/100 Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520.

Main memory 506 can be Random Access Memory (RAM), or any other dynamic storage device(s) commonly known in the art. Read-only memory 508 can be any static storage device(s) such as Programmable Read-Only Memory (PROM) chips for storing static information such as instructions for processor 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage, and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 506 is encoded with application(s) 522 that supports the functionality discussed herein (the application 522 may be an application that provides some or all of the functionality of the CD services described herein, including the client application). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret or otherwise perform the logic instructions of the application(s) 522. Execution of application(s) 522 produces processing functionality of the service related to the application(s). In other words, the process(es) 524 represent one or more portions of the application(s) 522 performing within or upon the processor(s) 504 in the computer system 500.

It should be noted that, in addition to the process(es) 524 that carries (carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508 and/or mass storage device 512.

Those skilled in the art will understand that the computer system 500 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

CONCLUSION

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

While various embodiments have been described herein, other manners are contemplated.

As used in this description, the term "portion" means some or all. So, for example, "A portion of X" may include some of "X" or all of "X". In the context of a conversation, the term "portion" means some or all of the conversation.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" ("e.g.,") and the like, is merely intended to better illustrate the invention and does not indicate a limitation on the scope of the invention unless specifically so claimed.

SOURCE CODE APPENDIX

```
/*
 * Returns the min_uses value for the passed cache,
 * scaled by how full the cache currently is.
```

SOURCE CODE APPENDIX

```
 */
static ngx_uint_t
ngx_http_file_cache_get_min_uses(ngx_http_cache_t *c,
ngx_int_t need_lock)
{
    ngx_http_file_cache_t *cache = c->file_cache;
    off_t           space_used;
    off_t           max_size = cache->max_size;
    off_t           step;
    ngx_uint_t      min_uses = c->min_uses;
    ngx_uint_t      min_uses_floor = c->min_uses_floor;
    ngx_uint_t      scaled;
    ngx_int_t       cold;
    if (min_uses <= 1) {
        return 1;
    }
    if (min_uses_floor == 0 || min_uses_floor >= min_uses)
    {
        return min_uses;
    }
    if (need_lock)
        ngx_shmtx_lock(&cache->shpool->mutex);
    space_used = cache->sh->size;
    cold = cache->sh->cold ? 1 : 0;
    if (need_lock)
        ngx_shmtx_unlock(&cache->shpool->mutex);
/*
 * If we haven't loaded everything from disk yet, we don't
 * know how much space we're using, so assume the worst.
 */
    if (cold){ /* Cache is cold */
        return min_uses;
    }
    if (space_used > max_size) {
    /* Don't scale to more than the original value. */
        space_used = max_size;
    }
    step = max_size / (min_uses - min_uses_floor + 1);
    scaled = (min_uses_floor - 1) + space_used / step;
    if (scaled < min_uses_floor - 1) {
        scaled = min_uses_floor - 1;
    }
    return scaled >= min_uses ? min_uses : scaled + 1;
}
```

We claim:

1. A computer-implemented method operable on a server in a content delivery (CD) network, wherein said CD network (CDN) distributes content on behalf of one or more subscribers, the method comprising, at said server:
   in response to a request from a client for a particular resource (R),
   (A) when said particular resource (R) is already in a cache on said server, serving said particular to said client from said cache; otherwise
   (B) when said particular resource (R) is not already in said cache,
      (B)(1) determining whether a count value (Count(R)) associated with said particular resource (R) exceeds a first threshold value (min uses), and, based on said determining, when said count value (Count(R)) exceeds said first threshold value (min_uses),
         (B)(1)(1) obtaining said particular resource (R) from another server;
         (B)(1)(2) caching said particular resource (R) obtained in (B)(1)(1) in said cache regardless of the amount of free space in said cache; and
         (B)(1)(3) serving said particular resource (R) obtained in (B)(1)(1) to said client; and,
      (B)(2) based on said determining in (B)(1), when said count value (Count(R)) is determined to be less than a second threshold value (min_uses_floor), (B)(2)(1) obtaining said particular resource (R) from another server; and (B)(2)(2) serving said particular resource (R) obtained in (B)(1)(1) to said client, wherein said particular resource (R) is not cached in said cache when said count value (Count(R)) is determined to be less than said second threshold value (min_uses_floor); and, (B)(3) when said count value (Count(R)) is determined to be: (i) greater than said second threshold value (min_uses_floor), and (ii) less than said first threshold value (min_uses), then (B)(3)(1) obtaining said particular resource (R) from another server;

(B)(3)(2) selectively caching said particular resource (R) in said cache when the amount of free space in said cache exceeds a third threshold; and (B)(3)(3) serving said particular resource (R) obtained in (B)(3)(2) to said client.

2. The method of claim 1, further comprising: setting said first threshold value (min_uses) and said second threshold value (min_uses_floor).

3. The method of claim 1, further comprising: prior to said obtaining in (B)(3)(1), determining said amount of space available in cache.

4. The method of claim 3, wherein said cache is divided into multiple parts, and wherein said particular resource (R) maps to one of said parts for caching.

5. The method of claim 4, wherein determining said amount of space comprises determining an amount of space in the one of said parts into which the particular resource (R) maps for caching.

6. The method of claim 1, wherein said other server is selected from: (i) an origin server; and (ii) a peer server of said server.

7. The method of claim 1, wherein said request from said client comprises a uniform resource locator (URL) associated with said particular resource (R).

8. The method of claim 7, wherein said method further comprises: modifying a request header associated with said request from said client prior to said obtaining in (B)(1)(1) and said obtaining in (B)(3)(1).

9. The method of claim 8, wherein said request header is modified to remove at least one range header item.

10. The method of claim 1, further comprising: incrementing said count value (Count(R)) associated with said particular resource (R).

11. An article of manufacture comprising a non-transitory computer-readable medium having program instructions stored thereon, the program instructions, operable on a server in a content delivery (CD) network, said instructions, when executed by a processor of said server, cause said server to:

in response to a request from a client for a particular resource (R), (a) when said particular resource (R) is already in a cache on said server, serve said particular to said client from said cache; otherwise (b) when said particular resource (R) is not already in said cache, (b)(1) determine whether a count value (Count(R)) associated with said particular resource (R) exceeds a first threshold value (min uses), and, based on said determining, when said count value (Count(R)) exceeds said first threshold value (min uses), (b)(1)(1) obtain said particular resource (R) from another server;

(b)(1)(2) cache said particular resource (R) obtained in (b)(1)(1) in said cache regardless of the amount of free space in said cache; and (b)(1)(3) serve said particular resource (R) obtained in (b)(1)(1) to said client; and, (b)(2) based on said determining in (b)(1), when said count value (Count(R)) is determined to be less than a second threshold value (min_uses_floor), (b)(2)(1) obtain said particular resource (R) from another server; and (b)(2)(2) serve said particular resource (R) obtained in (b)(1)(1) to said client, wherein said particular resource (R) is not cached in said cache when said count value (Count(R)) is determined to be less than said second threshold value (min_uses_floor); and, (b)(3) when said count value (Count(R)) is determined to be: (i) greater than said second threshold value (min_uses_floor), and (ii) less than said first threshold value (min_uses), then (b)(3)(1) obtain said particular resource (R) from another server;

(b)(3)(2) selectively cache said particular resource (R) in said cache when the amount of free space in said cache exceeds a third threshold; and (b)(3)(3) serve said particular resource (R) obtained in (b)(3)(2) to said client.

* * * * *